United States Patent
Fergen et al.

(10) Patent No.: US 9,953,435 B2
(45) Date of Patent: Apr. 24, 2018

(54) METHOD FOR CHECKING AN IMAGE INSPECTION SYSTEM

(71) Applicant: HEIDELBERGER DRUCKMASCHINEN AG, Heidelberg (DE)

(72) Inventors: Immanuel Fergen, Karlsruhe (DE); Frank Soltwedel, Hoffenheim (DE); Frank Schumann, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 15/378,315

(22) Filed: Dec. 14, 2016

(65) Prior Publication Data
US 2017/0169584 A1    Jun. 15, 2017

(30) Foreign Application Priority Data
Dec. 15, 2015  (DE) .................. 10 2015 225 252

(51) Int. Cl.
*G06F 3/12*  (2006.01)
*G06T 7/80*  (2017.01)
(Continued)

(52) U.S. Cl.
CPC ........... *G06T 7/80* (2017.01); *G06T 7/001* (2013.01); *H04N 1/00015* (2013.01);
(Continued)

(58) Field of Classification Search
None
See application file for complete search history.

(56) References Cited

U.S. PATENT DOCUMENTS 7,334,520 B2 * 2/2008 Geissler .............. B41F 33/0036
                                                          101/232
7,551,775 B2    6/2009 Tatarczyk
(Continued)

FOREIGN PATENT DOCUMENTS

DE   102004003612 A1   8/2005
DE   102007052785 A1   5/2009
(Continued)

*Primary Examiner* — Dung D Tran
(74) *Attorney, Agent, or Firm* — Laurence A. Greenberg; Werner H. Stemer; Ralph E. Locher

(57) ABSTRACT

A method is provided for checking an image inspection system having a camera system with a camera, an illumination apparatus for targeted illumination of a printing substrate, an image processing computer, and a main computer, for quality control of products of a printing substrate processing machine by using the main computer. A reference image is entered and transmitted to the main computer, a current printing image recorded by the camera system is transmitted to the image processing computer, a partial image in a suitable region of the current printing image, not being printed with printing image data, is selected in the image processing computer, the partial image is analyzed by comparison with the reference image in the image processing computer, and the inspection system is assessed based on the analysis of the partial image by the main computer and any defects of the inspection system being found are indicated.

11 Claims, 4 Drawing Sheets

(51) Int. Cl.
  *G06T 7/00*   (2017.01)
  *H04N 1/00*   (2006.01)
  *H04N 5/225*  (2006.01)
  *H04N 5/232*  (2006.01)
  *H04N 7/18*   (2006.01)

(52) U.S. Cl.
  CPC ..... *H04N 1/00045* (2013.01); *H04N 1/00055* (2013.01); *H04N 1/0057* (2013.01); *H04N 1/00665* (2013.01); *H04N 1/00748* (2013.01); *H04N 5/2256* (2013.01); *H04N 5/23293* (2013.01); *H04N 7/183* (2013.01); *G06T 2207/30144* (2013.01); *G06T 2207/30244* (2013.01); *H04N 2201/0084* (2013.01); *H04N 2201/0089* (2013.01); *H04N 2201/0091* (2013.01)

(56) References Cited

U.S. PATENT DOCUMENTS

| | | | | |
|---|---|---|---|---|
| 7,627,164 | B2* | 12/2009 | Oaki | G06T 7/001 382/144 |
| 7,974,458 | B2* | 7/2011 | Huang | H04N 5/2257 348/246 |
| 9,064,297 | B2* | 6/2015 | Kaneko | G06T 7/0002 |
| 9,183,434 | B2* | 11/2015 | Muraishi | G06K 9/00442 |
| 9,536,297 | B2* | 1/2017 | Araki | G06T 7/001 |
| 9,641,700 | B2* | 5/2017 | Schumann | H04N 1/00068 |
| 2005/0219564 | A1* | 10/2005 | Arai | G03G 15/5062 358/1.9 |
| 2012/0279410 | A1* | 11/2012 | Billmaier | B41F 21/12 101/484 |
| 2012/0315054 | A1* | 12/2012 | Kubo | G03G 15/5058 399/49 |
| 2012/0321327 | A1* | 12/2012 | Umeda | G03G 15/5062 399/15 |
| 2014/0036290 | A1* | 2/2014 | Miyagawa | H04N 1/40 358/1.13 |
| 2014/0079292 | A1* | 3/2014 | Kaneko | G06T 7/0002 382/112 |
| 2014/0268259 | A1* | 9/2014 | Kitai | H04N 1/00005 358/504 |
| 2014/0268260 | A1* | 9/2014 | Kitai | H04N 1/6027 358/521 |
| 2014/0285853 | A1* | 9/2014 | Hiramatsu | G06K 15/1872 358/3.24 |
| 2014/0314305 | A1* | 10/2014 | Yoshikawa | G06T 7/001 382/149 |
| 2015/0078627 | A1* | 3/2015 | Fukase | G06T 7/001 382/112 |
| 2015/0273816 | A1 | 10/2015 | Schumann et al. | |

FOREIGN PATENT DOCUMENTS

| | | |
|---|---|---|
| DE | 102008040364 A1 | 1/2010 |
| DE | 102011100413 A1 | 11/2012 |
| DE | 102014004556 A1 | 10/2015 |

* cited by examiner

METHOD FOR CHECKING AN IMAGE INSPECTION SYSTEM

CROSS-REFERENCE TO RELATED APPLICATION

This application claims the priority, under 35 U.S.C. § 119, of German Patent Application DE 10 2015 225 252.3, filed Dec. 15, 2015; the prior application is herewith incorporated by reference in its entirety.

BACKGROUND OF THE INVENTION

Field of the Invention

The present invention relates to a method for checking image inspection systems for their ability to function.

The invention belongs to the technical field of test automation.

According to the prior art, image inspection methods are used in printing technology to check the printed products being produced for possible errors as part of the performance of a printing application. To this end, the printing products are scanned by way of a camera, sent to a computer, and compared there with a digital reference image. The reference image in that case can be generated digitally from the preliminary stage data of the printing application, or by a process which is referred to as teach-in or teaching. In that case, the printing image is printed repeatedly in the printing machine, captured by the cameras, and then a reference image is generated from the thus digitally generated data, which reference image is as close as possible to the target printing image known from the preliminary stage data and also incorporates the technical capabilities and limitations of the printing machine being used. When comparing the digital reference image and the current printing image generated in the actual printing method, deviations between the two images are identified as errors and indicated, depending on parameterization of the comparison algorithms.

One problem in that case is that such deviations in the printing image cannot always be traced back to actually occurring image errors in the printed printing image. What frequently happens is that in fact an incorrect configuration or a specific state of the image inspection system is responsible for those resulting deviations in the currently recorded digital printing image. For example, inadequate alignment of the cameras leads to a situation in which it is not possible to compare the entire printing image or the desired detail of the printing image with the reference image. That means in the best case scenario, that the inspection system independently identifies that the reference image and the current printing image to be controlled no longer coincide. In the worst-case scenario, in particular if only partial regions or details of the printing image are compared, that can mean that the inspection system randomly indicates a high number of printing errors. In both cases, proper functioning of the image inspection system and thus the quality control of the printing products being produced are impossible. Further error sources are, for example, defects in the illumination unit, which impact contrast, color values and other image parameters of the recorded captured printing image and thus make comparison with the digital reference image difficult or impossible. Soiling on the camera lens, which results in identification of errors which are actually not present, significantly worsens the inspection quality.

In the prior art, such errors have heretofore not been captured in an automated check of the image inspection system. The state and configuration of the image inspection system have until now been manually checked, if at all, by the operator of the printing machine at the start of a new printing application.

What is also known is that, as part of the start-up of the printing machine including the image inspection system and for field tests, recordings of the image inspection system in the form of the entire printing image are captured by the cameras of the inspection system and transmitted remotely to the service for checking for evaluation purposes. That procedure, however, is associated with a high level of complexity and is additionally subject to legal limitations. For example, in order to transfer a total image thus recorded, both the agreement of the customer who ordered the print and the agreement of the operator of the printing facility or the printing machine are necessary. Regular, even automated evaluation is therefore not possible in particular for data protection reasons. Reliable statements regarding the state of the inspection system therefore typically only come about after a complaint has been lodged by the printing machine operator through the service. The printing machines thus often operate only with unreliable image inspection and a correspondingly high degree of paper waste.

German Patent Application DE 10 2014 004 556 A1, corresponding to U.S. Patent Application US 2015/0273816, additionally discloses a system and a method for checking an image inspection system, in which the function of the image inspection system with respect to its ability to identify errors itself is checked. That is achieved by way of introducing artificial errors which are not present in reality into the digitally present printing image and making that error image thus produced available to the image inspection system for reasons of comparison with the reference image. What is checked in that case is whether the image inspection system identifies the artificially introduced errors, and on the basis of that comparison, the functionality and the performance of the tested image inspection system are assessed. However, since that method checks only the functionality of the image comparison and skips the process of image capturing by way of the hardware of the image inspection system in the form of the cameras and the illumination, etc. by feeding in the digital error image, it is not possible with that method to make any statements regarding the functionality of the image inspection system in terms of hardware, in particular the camera, alignment of the camera, possible soiling of the lens and calibration, etc.

German Patent Application DE 10 2011 100 413 A1, corresponding to U.S. Patent Application US 2012/0279410, in turn discloses a method for ascertaining adjustment errors in a sheet-fed printing machine, in which the geometry of the passing printing sheet is recorded by an imaging system and compared with predetermined geometries for evaluation. From that comparison, possible adjustment errors of the printing machine are deduced, such as for example faulty sheet transfer due to incorrect adjustment of the gripper bar or lifting of the sheet due to incorrect adjustment of the blowing air for the sheet guidance. It is thus known from that method how it is possible to deduce the adjustments of the hardware of the printing machine from the evaluation of a printing image. However, it is not disclosed how a possible image inspection system with its very specific hardware can be checked with respect to its configuration of exactly that hardware.

SUMMARY OF THE INVENTION

It is accordingly an object of the invention to provide a method for checking an image inspection system, which overcomes the hereinafore-mentioned disadvantages of the heretofore-known systems of this general type, with which errors in the functioning of an image inspection system for products of a printing substrate processing machine can be ascertained in automated fashion and which can be performed more efficiently and with less complexity than the procedures known to date from the prior art.

With the foregoing and other objects in view there is provided, in accordance with the invention, a method for checking an image inspection system including a camera system having at least one camera, an illumination apparatus for the targeted illumination of the printing stock or substrate, an image processing computer, and a main computer for quality control of products of a printing substrate processing machine by way of the main computer, including the following steps:

1. teaching, learning or entering a reference image and transmitting the reference image to the main computer;
2. recording a current printing image by way of the camera system and transmitting the current printing image to the image processing computer;
3. selecting at least a partial image in a suitable region of the current printing image, which is not printed with printing image data, in the image processing computer;
4. analyzing the at least one partial image by way of comparison with the reference image in the image processing computer; and
5. assessing the inspection system on the basis of the analysis result of the at least one partial image by the main computer and indication of any defects of the inspection system being found.

The key points of the method according to the invention are first that in order to perform this method for checking the image inspection system, only image regions of the currently recorded printing image are captured which are not printed with image data of the current printing image. This avoids legal difficulties with respect to data protection, and automated comparison as part of the function of the image inspection system is possible. Of course, the selected regions in this case preferably include regions which are also present in the reference image for comparison. It is then possible from these recorded image regions to ascertain by way of the comparison with the corresponding regions of the reference image whether the image inspection system is still in a proper state and the results attained by the inspection system contain valid statements at all.

One preferred development of the method according to the invention in this case is that the assessment of the inspection system is carried out with respect to potential error sources, such as alignment of the at least one camera, state of the illumination, soiling of the camera lens, and the calibration of the inspection system. It is possible on the basis of the analysis result, which is obtained from the comparison of the selected regions of the current printing image with the corresponding regions of the reference image, to deduce whether the alignment of the at least one camera and the state of the illumination are still within the desired parameters. Even potential soiling of the camera lens can be ascertained by the evaluation of the analysis result. The same is likewise true for potential calibration errors of the inspection system itself.

Another further preferred development of the method according to the invention in this case is that the found defects are displayed on a screen that is connected to the computer and/or are captured in a protocol which is stored in a memory that is connected to the computer. The output of the defects found with respect to the state of the image inspection system is displayed for the user of the printing machine on a screen that is connected to the computer. Additionally or alternatively, depending on the embodiment, the results are held in a protocol which is then stored in digital form in a memory which can be accessed by the computer.

A further preferred development of the method according to the invention in this case is that the computer is connected to a network for remote data transmission, and the protocol is transmitted from the computer to a remote service computer.

Since the defects of the image inspection system found when performing the method according to the invention often cannot be remedied by the user of the printing machine himself or herself, it is advantageous to transmit the defects held in the protocol directly to a server of a service provider of the printing machine. In this case, the ascertained defects can be evaluated to provide appropriate support to the customer, i.e. the user of the printing machine, so as to fix the defects which have occurred.

An additional further preferred development of the method according to the invention in this case is that printed areas which contain no printing image data, such as color measurement fields and/or registration marks, and/or non-printed areas are used as suitable regions.

Unprinted regions of the finished printing image are especially suitable for the method. If structures occur where definitively no printing data should be present, this is a clear sign of a defective function. The brightness profile of the unprinted paper can also be evaluated. However, regions having registration marks or color measurement fields are also suitable, since these are printed but do not contain any image data that is subject to data protection.

Another further preferred development of the method according to the invention in this case is that the image inspection system is integrated in a sheet-fed printing machine for performing a method for in-line sheet inspection. Most image inspection systems are integrated directly into the corresponding printing machines for reasons of efficiency. In the case of a sheet-fed printing machine, they are often disposed downstream of or attached to the last printing or coating unit of the printing machine. In-line sheet inspection is possible in this way, which is significantly more efficient than any later image inspection of the sheet which does not take place until after the delivery device. The method according to the invention must correspondingly take into account the requirements of such in-line image inspection.

A further preferred development of the method according to the invention is that non-printed areas of the current printing image at the gripper bars and/or at the rear sheet edge are used as suitable regions. Particularly suitable regions of the currently recorded printing image in a printed sheet of a sheet-fed printing machine, which are not printed with printing image data, are in particular the image regions at the gripper bars and at the rear sheet edge. By recording the image contrast between a gripper bar and the printing stock or substrate, it is possible for example to ascertain very efficiently a misalignment of the at least one camera.

An added further preferred development of the method according to the invention in this case is that the image inspection system is integrated in a web printing machine, in particular a web offset printing machine, a web inkjet printing machine or a web toner printing machine, for carrying out a method for in-line image inspection. Even in the case of web printing machines, most image inspection systems are integrated directly into the corresponding printing machines for reasons of efficiency. The method according to the invention, even in this case, must correspondingly take into consideration the requirements of such an in-line image inspection.

An additional preferred development of the method according to the invention in this case is that the method is an automated method which is performed as part of or parallel to the inspection method at regular intervals. The method in this case is performed in an automated fashion, wherein the image inspection system performs in parallel both the actual image inspection for checking the printing quality and the method according to the invention to check the status of the image inspection system. The intervals at which the method according to the invention is performed parallel to the actual image inspection can be set by the user of the printing machine and/or be made dependent on the capacity of the image inspection system.

A concomitant preferred development of the method according to the invention in this case is that the analysis of the at least one partial image in the computer is performed by applying statistical methods to the profile of the contrast. The statistical methods include for example using the averages and/or the standard deviation of the brightness values over the selected region of the printing image. If the camera lens is soiled, it will be possible to determine, for example, a clear brightness deviation on the unprinted paper substrate. This can be captured by way of analysis of the standard deviation. Further statistical analysis methods are also conceivable.

Other features which are considered as characteristic for the invention are set forth in the appended claims.

Although the invention is illustrated and described herein as embodied in a method for checking an image inspection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
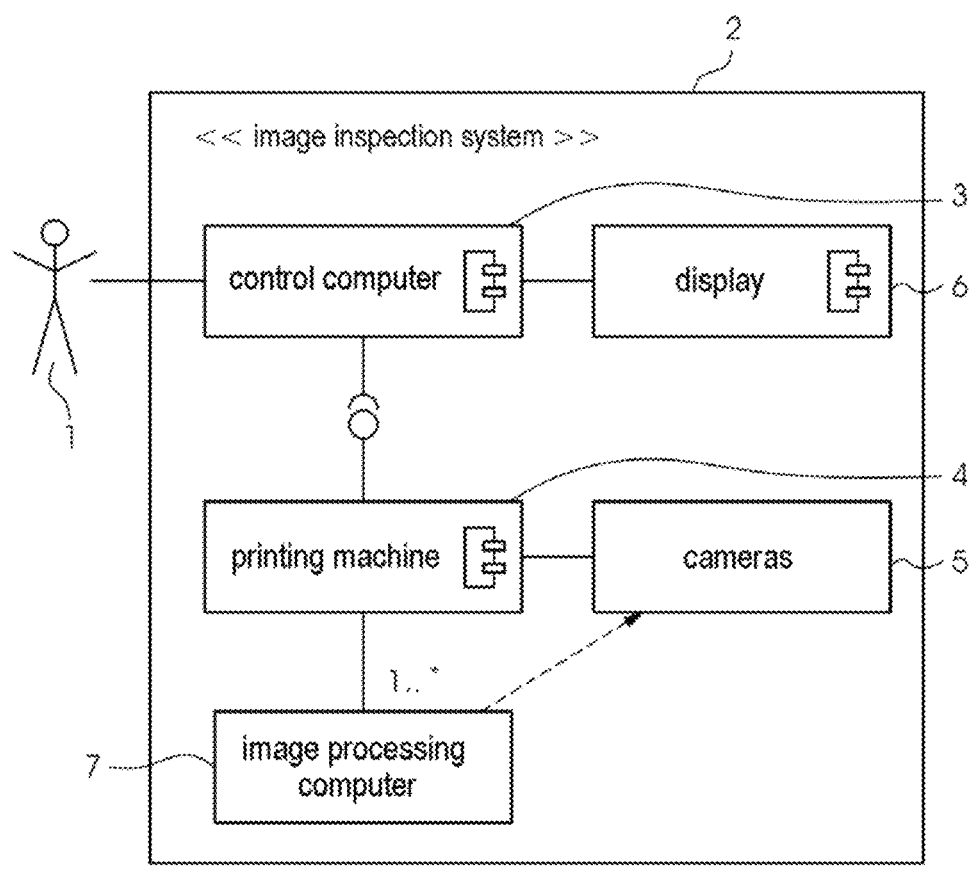
FIG. 1 is a block diagram showing the structural setup of the image inspection system.

Referring now in detail to the figures of the drawings, in which mutually corresponding elements are each provided with the same reference signs, and first, particularly, to FIG. 1 thereof, there is seen an image inspection system 2 which in this case is formed of a control or main computer 3 which is connected to a display device 6, through which a user 1 can configure the system 2. In an integrated image inspection system 2, which is part of a printing machine 4, the display or screen 6 of the control system of the printing machine 4 can also be used for this purpose. In this case, cameras 5 are disposed inside the printing machine 4, specifically typically downstream of the last printing or coating unit. An image processing computer 7, which is directly connected to the cameras 5 and thus is likewise part of the printing machine 4, immediately analyzes and evaluates images 12 received from the cameras 5. The results of this analysis 17 are then passed on to the control and main computer 3 of the image inspection system 2, where a corresponding evaluation 18 of the analysis results 17 with respect to any defects in the adjustment of the image inspection system 2 takes place. The actual function of the image inspection system 2, specifically the checking of the printing sheets being produced, is also performed in this way. The described setup is illustrated schematically and structurally in FIG. 1.

Figure 2:
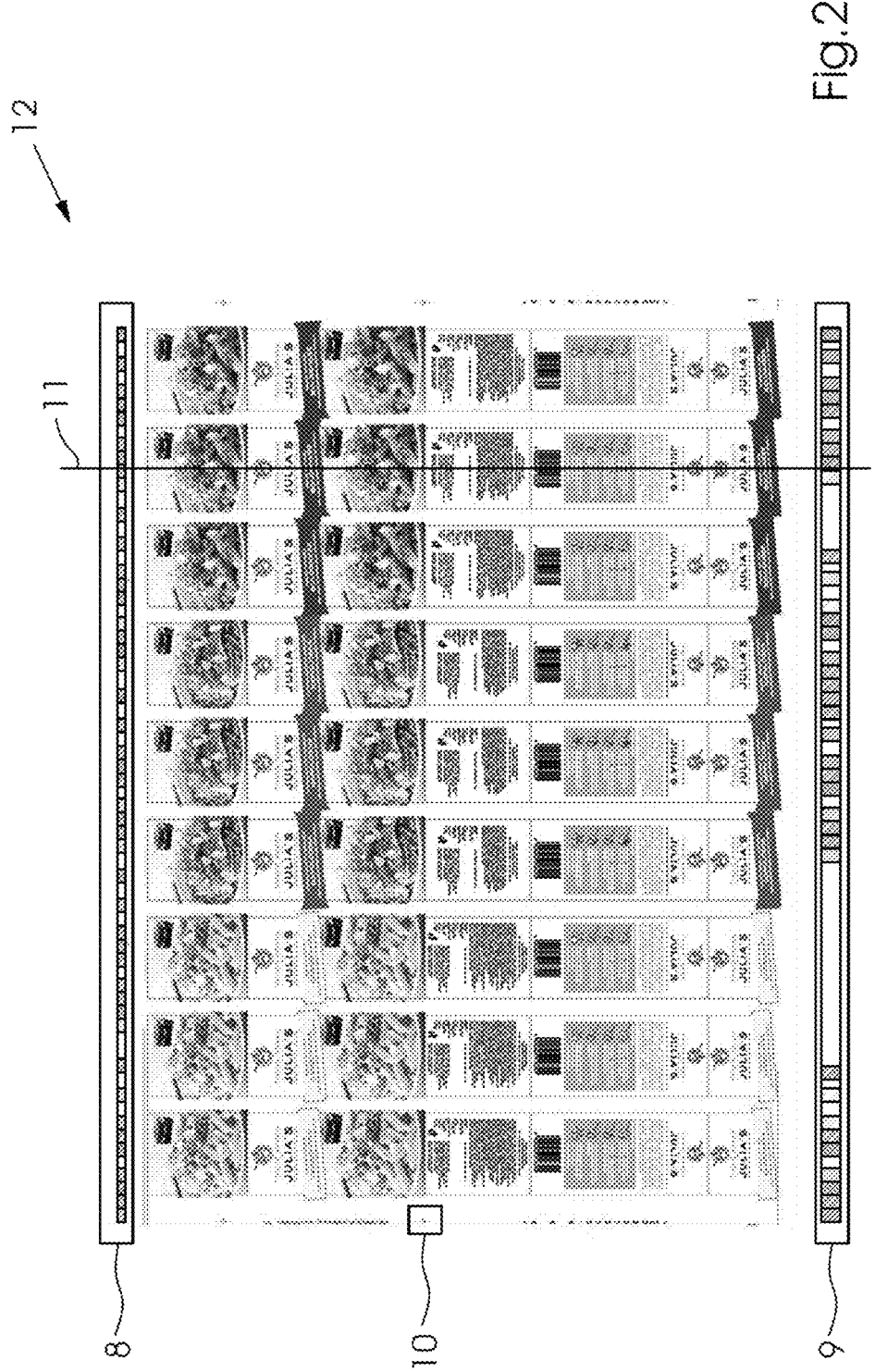
FIG. 2 is a view showing an example of a current printing image.

FIG. 2 illustrates an example of a currently recorded printing image 12. An elongate error 11 which symbolizes a soiled camera lens can be seen in this case. In this case, regions of color measurement fields 8, 9 and of registration marks 10, which are not part of the normal printing image data, are selected for this purpose as selected image regions 16 for analysis. After teaching and analysis of a reference image 15, the next method step is the recording of a current printing image 12. This also takes place as part of the normal image inspection of the printed sheets by way of the image inspection system 2. According to the previously selected image regions, the image region or regions 16 are now selected from the current printing image 12. The selected image regions 16 are then investigated by way of statistical analysis, in particular of the contrast profile.

Figure 3:
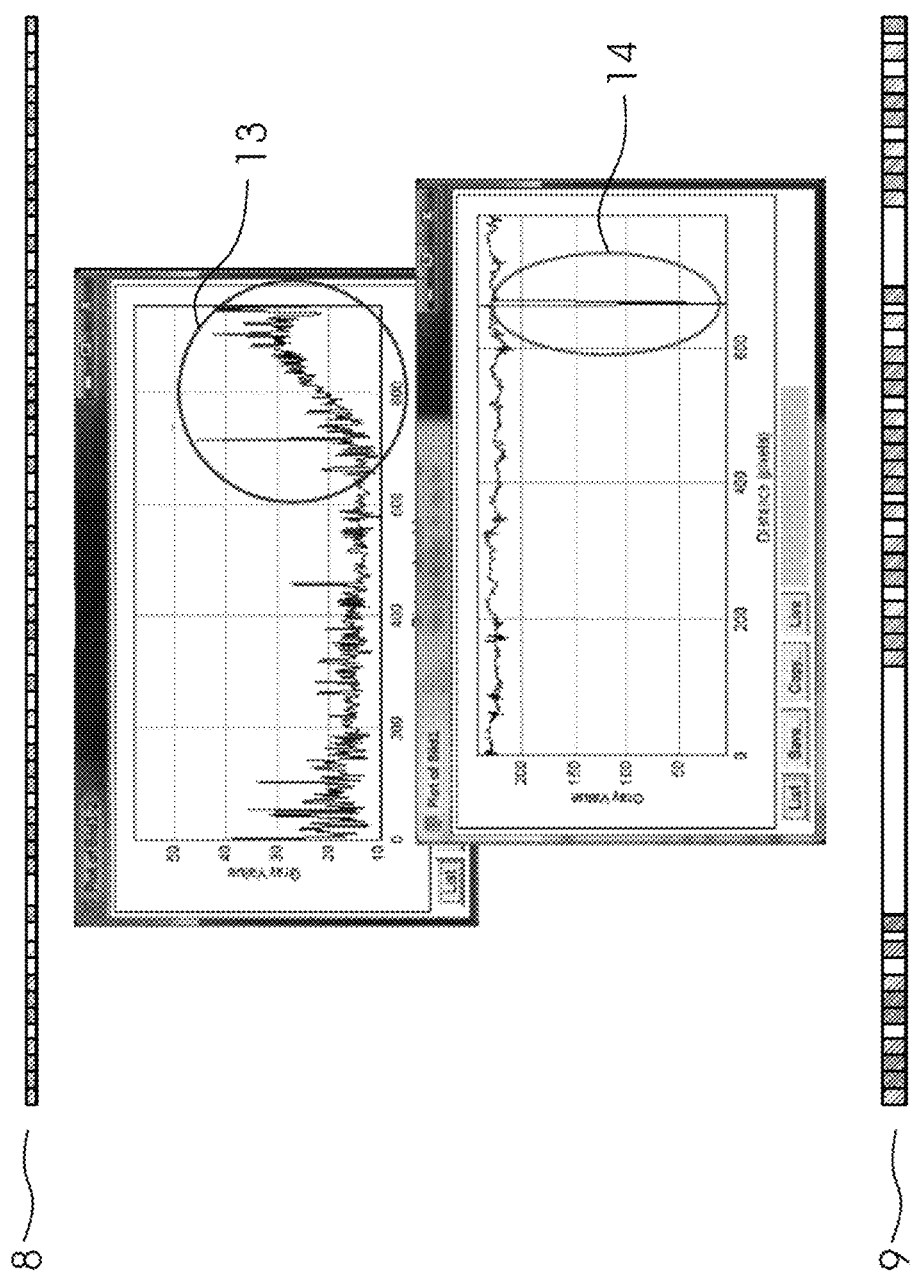
FIG. 3 is a group of views showing the analyzed current printing image.

FIG. 3 illustrates the result of such a statistical analysis profile 17. In this example, the two rows of color measurement fields, which were previously selected for observation, are examined in more detail. In this case, the analysis in the present example shows that the upper color measurement fields 8 show a strong deviation with respect to the gray values, as is emphasized in a circled reflection section 13. The latter shows a reflection 13 into the camera. The evaluation of the bottom row of color measurement fields 9 in turn shows a strong color value or gray value deviation by way of a dark vertical line 14 over the printing image 12. These analysis results 17 are evaluated in the main computer 3 of the image inspection system 2. The reflection 13 into the camera 5 in the first selected image region 8 means that the cameras 5 are inadequately aligned, and additionally the illumination may not be sufficient. The analysis result 17 of the second selected image region 9 in turn indicates a strong deviation in the gray values in the form of a dark vertical line 14, which is very probably caused by soiling of the camera and thus indicates that cleaning of the camera lenses is necessary. The ascertained errors are then displayed by the connected display 6 of the image inspection system 2, in this case the wall screen of the printing machine 4. The user 1 can thereby undertake the necessary steps to eliminate these errors.

Figure 4:
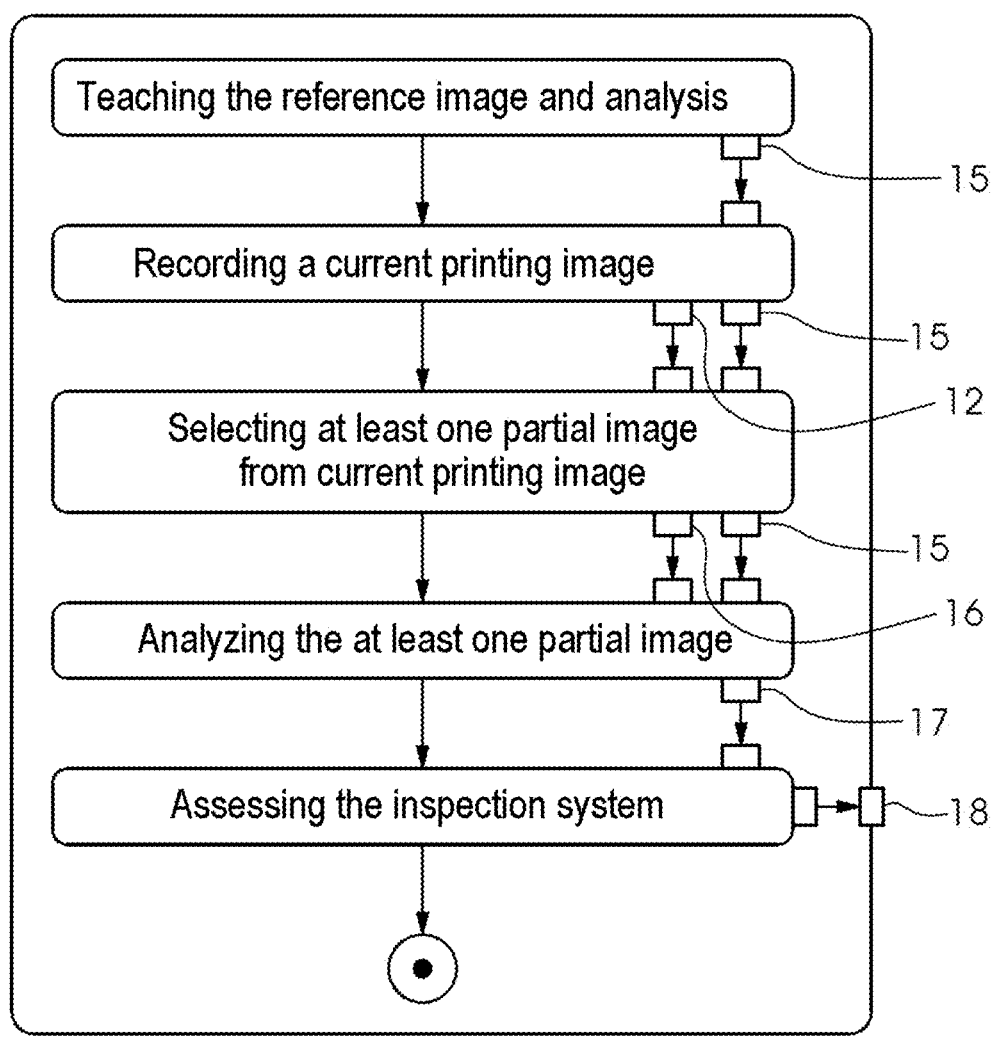
FIG. 4 is a flow diagram showing the procedure of the method according to the invention.

FIG. 4 once again schematically shows the basic procedure of the method according to the invention. In a first step, the reference image 15 is taught. For the normal functioning of the image inspection system 2, this reference image 15 is then used as a basis of comparison for a pixel-by-pixel comparison of a currently recorded printing image 12. The method according to the invention, for checking the status and the adjustment of the image inspection system 2, proceeds from there. Starting from the reference image 15, which is analyzed, an ascertainment is made as to which image regions of the printing image 8, 9, 10 should be used for the analysis according to the specification that no data-protection-relevant printing image regions must be used. Typically, the main computer 3 of the image inspection system 2 is configured in such a way that all generally possible image regions 8, 9, 10 which meet these requirements are already specified. Then a decision is made on the basis of the analysis of the reference image as to which of these image regions in the current reference image 15 are the most suitable for analysis.

In one further preferred embodiment variant, a protocol of the ascertained errors is additionally automatically set up in digital form, and this protocol is passed on with the agreement of the user 1 over the Internet to the remote service responsible for the printing machine 4. The remote service can then take the necessary steps to fix these errors. This is expedient in particular where the local users 1 of the printing machine 4 are not trained or authorized to fix the errors in the image inspection system 2.

The following is a summary list of reference numerals and the corresponding structure used in the above description of the invention:

1 user
2 image inspection system
3 control/main computer
4 printing machine
5 camera system
6 display
7 image processing computer
8 upper image detail color measurement row
9 bottom image detail color measurement row
10 image detail registration mark
11 image error due to camera soiling
12 current printing image
13 image reflection due to incorrect camera setting
14 color value deviation due to soiling
15 reference image
16 image detail from current printing image
17 analysis result of the image detail
18 evaluation result of the image inspection system

The invention claimed is:

1. A method for checking an image inspection system used in printing technology, the method comprising the following steps:
providing a camera system having at least one camera, an illumination apparatus for a targeted illumination of a printing substrate, an image processing computer, and a main computer, for quality control of products of a printing substrate processing machine by using the main computer;
using the printing technology inspection system to check printed products being produced in a printing machine for possible errors as part of a performance of a printing application, by:
entering a reference image and transmitting the reference image to the main computer;
using the camera system to record a current printing image and transmitting the current printing image to the image processing computer;
using the image processing computer to select at least one partial image in a suitable region not being printed with printing image data in the current printing image;
analyzing the at least one partial image by comparison with the reference image in the image processing computer by applying statistical methods to a contrast profile; and
using the main computer to assess the inspection system based on a result of the analysis of the at least one partial image, to indicate any defects found in the inspection system and to eliminate found defects in the inspection system to ensure a quality check of printed printing products.

2. The method according to claim 1, which further comprises carrying out the assessment of the inspection system with respect to potential error sources selected from the group consisting of an alignment of the at least one camera, a state of the illumination, a soiling of a lens of the at least one camera and a calibration of the inspection system.

3. The method according to claim 1, which further comprises at least one of:
displaying the defects being found on a screen connected to the main computer, or
capturing the defects being found in a protocol stored in a memory connected to the main computer.

4. The method according to claim 3, which further comprises connecting the main computer to a network for remote data transmission, and transmitting the protocol from the main computer to a remote service computer.

5. The method according to claim 1, which further comprises selecting the printed areas containing no printing image data as at least one of color measurement fields or registration marks or non-printed areas.

6. The method according to claim 1, wherein the image inspection system is integrated in a sheet-fed printing machine for carrying out a method for in-line image inspection.

7. The method according to claim 6, which further comprises using non-printed areas of a current printing image at least at one of gripper bars or a rear sheet edge as suitable regions.

8. The method according to claim 1, wherein the image inspection system is integrated in a sheet-fed printing machine selected from the group consisting of a sheet-fed offset printing machine, a sheet-fed inkjet printing machine and a sheet-fed toner printing machine, for carrying out a method for in-line image inspection.

9. The method according to claim 1, wherein the image inspection system is integrated in a web printing machine, for carrying out a method for in-line image inspection.

10. The method according to claim 1, wherein the image inspection system is integrated in a web printing machine selected from the group consisting of a web offset printing machine, a web inkjet printing machine and a web toner printing machine, for carrying out a method for in-line image inspection.

11. The method according to claim 1, which further comprises carrying out the method as an automated method performed as part of or parallel to the inspection method at regular intervals.

* * * * *